United States Patent
Eckman et al.

(10) Patent No.: US 9,085,894 B2
(45) Date of Patent: Jul. 21, 2015

(54) ACOUSTICAL SOUND PROOFING MATERIALS AND METHODS OF MAKING THE SAME

(71) Applicant: Georgia-Pacific Gypsum LLC, Atlanta, GA (US)

(72) Inventors: Douglas C. Eckman, Canton, GA (US); Vincent B. Thomas, Bogart, GA (US); Keshav S. Gautam, Duluth, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 14/062,377

(22) Filed: Oct. 24, 2013

(65) Prior Publication Data

US 2014/0050902 A1 Feb. 20, 2014

Related U.S. Application Data

(62) Division of application No. 13/108,313, filed on May 16, 2011, now Pat. No. 8,590,272.

(60) Provisional application No. 61/352,142, filed on Jun. 7, 2010.

(51) Int. Cl.
| | |
|---|---|
| *E04B 1/84* | (2006.01) |
| *B32B 7/14* | (2006.01) |
| *B32B 13/02* | (2006.01) |
| *B32B 37/12* | (2006.01) |
| *E04B 1/86* | (2006.01) |

(52) U.S. Cl.
CPC ... *E04B 1/84* (2013.01); *B32B 7/14* (2013.01); *B32B 13/02* (2013.01); *B32B 37/1292* (2013.01); *E04B 1/86* (2013.01); *B32B 2262/062* (2013.01); *B32B 2262/065* (2013.01); *B32B 2262/101* (2013.01); *B32B 2307/102* (2013.01); *B32B 2307/3065* (2013.01); *B32B 2307/56* (2013.01); *B32B 2607/00* (2013.01); *E04B 2001/8466* (2013.01); *Y10T 156/10* (2015.01); *Y10T 428/24132* (2015.01); *Y10T 428/24826* (2015.01); *Y10T 428/24851* (2015.01)

(58) Field of Classification Search
CPC .......... E04B 1/84; B32B 7/14; B32B 37/1292
USPC ................ 52/787.11; 428/196, 198, 200, 201
See application file for complete search history.

(56) References Cited

U.S. PATENT DOCUMENTS

| | | | | |
|---|---|---|---|---|
| 5,063,098 | A * | 11/1991 | Niwa et al. ..................... | 428/76 |
| 7,318,498 | B2 * | 1/2008 | Woodman et al. ............ | 181/290 |
| 7,485,360 | B2 * | 2/2009 | Barnes et al. ................. | 428/182 |
| 7,547,650 | B2 * | 6/2009 | Keep ............................. | 442/414 |
| 7,799,410 | B2 * | 9/2010 | Tinianov ....................... | 428/212 |
| 7,883,763 | B2 * | 2/2011 | Tinianov ....................... | 428/201 |
| 8,318,281 | B2 * | 11/2012 | Mansson et al. .............. | 428/43 |

(Continued)

*Primary Examiner* — Andrew J Triggs
(74) *Attorney, Agent, or Firm* — Ram W. Sabnis

(57) ABSTRACT

A laminated structure comprises a first external layer and a second external layer; an internal layer disposed between the first and the second external layers; a first adhesive layer disposed between the first external layer and the internal layer, wherein the first adhesive layer is patterned to cover only a first portion of the internal layer; and a second adhesive layer disposed between the second external layer and the internal layer, wherein the second adhesive layer is patterned to cover only a second portion of the internal layer on a side opposite the first adhesive layer, and wherein the first portion is different than the second portion.

15 Claims, 1 Drawing Sheet

(56) References Cited

U.S. PATENT DOCUMENTS

| | | | |
|---|---|---|---|
| 8,590,272 B2* | 11/2013 | Thomas et al. ............ 52/784.11 |
| 8,652,288 B2* | 2/2014 | Blinkhorn et al. ......... 156/308.2 |
| 2005/0090170 A1* | 4/2005 | Jackson ........................ 442/218 |
| 2008/0245603 A1* | 10/2008 | Tinianov ....................... 181/207 |
| 2008/0251198 A1* | 10/2008 | Tinianov ....................... 156/291 |
| 2009/0000245 A1* | 1/2009 | Tinianov et al. ............. 52/782.1 |
| 2009/0004448 A1* | 1/2009 | Tinianov ....................... 428/212 |
| 2009/0202774 A1* | 8/2009 | Mansson et al. ................ 428/43 |
| 2009/0280356 A1* | 11/2009 | Tinianov et al. .............. 428/703 |
| 2009/0292032 A1* | 11/2009 | Gupta et al. ..................... 521/85 |
| 2011/0165429 A1* | 7/2011 | Tinianov et al. .............. 428/522 |
| 2011/0296794 A1* | 12/2011 | Thomas et al. ............ 52/784.11 |
| 2013/0087409 A1* | 4/2013 | Payot et al. .................... 181/294 |
| 2013/0240111 A1* | 9/2013 | Tinianov ......................... 156/60 |
| 2013/0240291 A1* | 9/2013 | Tinianov ....................... 181/294 |
| 2014/0050902 A1* | 2/2014 | Eckman et al. ............... 428/198 |
| 2014/0083610 A1* | 3/2014 | Bennett ....................... 156/304.4 |
| 2014/0130969 A1* | 5/2014 | McCutcheon et al. ........ 156/247 |
| 2014/0134406 A1* | 5/2014 | Son ............................... 428/192 |

* cited by examiner

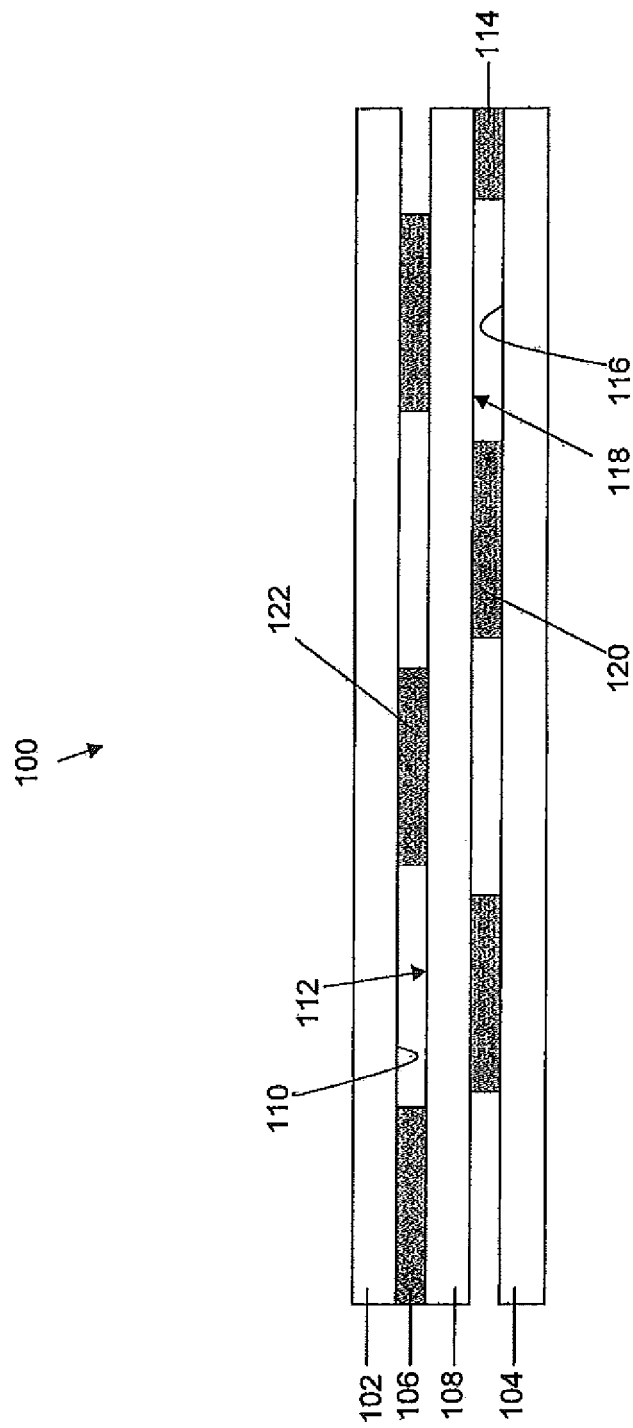

ACOUSTICAL SOUND PROOFING MATERIALS AND METHODS OF MAKING THE SAME

CROSS-REFERENCE TO RELATED APPLICATION

This application is a Divisional application of co-pending U.S. patent application Ser. No. 13/108,313, filed on May 16, 2011, which claims the benefit of U.S. Provisional Application No. 61/352,142, filed Jun. 7, 2010, each of which is hereby incorporated by reference in its entirety.

BACKGROUND OF THE INVENTION

The present disclosure generally relates to building materials and, more particularly, to acoustical sound proofing materials that reduce the transmission of sound from one room to an adjacent room. Methods of making the acoustical sound proofing material are also disclosed.

Noise control is a rapidly growing economic and public policy concern for the construction industry. Areas with high acoustical isolation (commonly referred to as 'soundproofed') are requested and required for a variety of purposes. Apartments, condominiums, hotels, schools and hospitals all require rooms with doors, walls, ceilings and floors that reduce the transmission of sound thereby minimizing, or eliminating, the disturbance to people in adjacent rooms. Soundproofing is particularly important in buildings adjacent to public transportation, such as highways, airports and railroad lines. One measure of the severity of multi-party residential and commercial noise control issues is the widespread emergence of model building codes and design guidelines that specify minimum Sound Transmission Class (STC) ratings for specific wall and door structures within a building.

In the past, walls typically were made up of studs with drywall on both exterior surfaces of the studs and baffles or plates commonly placed between the studs in an attempt to reduce the transmission of sound from one room to the next. Unfortunately, even the best of such walls using standard drywall are capable of only reducing sound transmission by approximately 30 db, and much of that is focused on mid-range and high frequencies rather than lower frequencies which cause most of residential and commercial complaints.

Various techniques and products have emerged to abate this problem. For example, replacement of wooden studs by steel studs, resilient channels to offset and isolate drywall panels from studs, mass-loaded vinyl barriers, cellulose sound-board, cellulose and fiberglass batt insulation, and techniques such as staggered-beam and double-beam construction. All help reduce the transmission of noise, but, again, not to such an extent that certain sounds (e.g., lower frequencies, high decibel) in a given room are prevented from being transmitted to an adjacent room, including rooms above or below.

Accordingly, a need remains for an acoustical sound proofing material and a new method of construction to reduce the transmission of sound from a given room to an adjacent room.

This application claims priority to U.S. Provisional Patent Application No. 61/352,142 filed Jun. 7, 2010, 2010, the disclosure of which is incorporated herein in its entirety by this reference.

BRIEF DESCRIPTION OF THE INVENTION

Disclosed herein are laminated structures comprising a first external layer and a second external layer; an internal layer disposed between the first and the second external layers; a first adhesive layer disposed between the first external layer and the internal layer, wherein the first adhesive layer is patterned to cover only a first portion of the internal layer; and a second adhesive layer disposed between the second external layer and the internal layer, wherein the second adhesive layer is patterned to cover only a second portion of the internal layer on a side opposite the first adhesive layer, and wherein the first portion is different than the second portion.

Also disclosed herein is a fire door comprising a first external door layer comprising a gypsum fiberboard and a second external door layer comprising a gypsum fiberboard; an internal door core layer disposed between the first and the second external door layers, wherein the internal door core comprises a gypsum panel board; a first adhesive layer disposed between the first external door layer and the internal door core, wherein the first adhesive layer comprises a viscoelastic hot melt adhesive and is patterned to cover only a first portion of the internal door core; and a second adhesive layer disposed between the second external door layer and the internal door core, wherein the second adhesive layer comprises a viscoelastic hot melt adhesive and is patterned to cover only a second portion of the internal door core on a side opposite the first adhesive layer, and wherein the first portion is different than the second portion.

A method of making a laminate structure is also disclosed, wherein the method comprises applying a first adhesive in a first discontinuous pattern on a surface of a first external layer and/or an internal layer; adhering the first external layer to the internal layer; applying a second adhesive in a second discontinuous pattern on a surface of the internal layer opposite the first external layer and/or on a second external layer; and adhering the second external layer to the internal layer, wherein the first discontinuous pattern and the second discontinuous pattern are offset such that no portion of the first adhesive overlaps with the second adhesive.

The above described and other features are exemplified by the following detailed description.

BRIEF DESCRIPTION OF THE DRAWINGS

Referring now to FIG. 1, wherein the like elements are numbered alike, FIG. 1 is a cross-sectional view of an exemplary embodiment of a laminate structure having acoustical sound proofing properties.

DETAILED DESCRIPTION OF THE INVENTION

Disclosed herein are building materials, particularly laminated structures for use in constructing walls, floors, ceilings or doors, that provide a significant improvement in the sound transmission class (STC) rating associated with the structures. In one embodiment, a laminated structure comprises two external layers, at least one internal layer, and two or more adhesive layers separated by the at least one internal layer, wherein each of the two or more adhesive layers forms a discontinuous pattern between the internal layer and a selected one of the external layers, and wherein the discontinuous patterns of the two or more adhesive layers are offset from one another such that no portion of one adhesive layer overlaps any portion of the other adhesive layers.

The adhesive layers reduce the transmission of vibrational energy from one layer to adjacent layer of the structure by mechanically isolating layers of the structure so that they vibrate independently. Moreover, the discontinuous pattern formed by each adhesive layer serves to prevent lateral movement of air between layers by providing isolated uncoated (i.e., adhesiveless) sealed spaces, defined by the substrate on top and bottom and adhesive layer on either side, to which the air can travel. The sound waves, therefore, are not forced to transfer into the adjacent layers of the structure as they would be with continuous layers of adhesive disposed between the internal and external layers. Further, misaligning the patterns of each adhesive layer provides a tortuous path for transfer of the sound waves through the structure, which enhances the structure's ability to dissipate sound. Providing an offset pattern of adhesive layers such that no portion of one adhesive layer overlaps with any other adhesive layers means there is no direct line through the cross-section of the laminated structure that a sound wave could pass without traveling through at least one of the uncoated spaces in at least one of the adhesive layers. The density gradients that are created in addition to the tortuous path of the adhesive and the air gap improves the attenuation response of the laminate.

FIG. 1 shows an exemplary embodiment of a laminated structure 100 according to the present invention. With regard to FIG. 1, the layers in the structure are described from top to bottom as it is horizontally oriented therein. The references to top and bottom with respect to the layers is not intended to be limiting, but rather are used to distinguish one layer from another as they happen to be oriented in FIG. 1. The top layer 102 is an external layer of the laminated structure 100. The bottom layer 104 provides the other external layer of the structure. The top and bottom layers are configured to provide structural integrity to the laminated structure 100. As such, any building material known to those of skill in the art used for constructing walls, floors, ceilings, roofs, doors, and the like can be used to form the top layer 102 and/or the bottom layer 104. In one embodiment, the top layer 102 and the bottom layer 104 comprise the same materials. In another embodiment, the top layer 102 comprises a material different than that of the bottom layer 104. Exemplary materials for use as the top layer and/or bottom layer can include, without limitation, gypsum board, wafer board, particle board, oriented strand board (OSB), plywood, fiberboard, medium density fiberboard (MDF), oriented strand lumber (OSL) parallel strand lumber (PSL), laminated veneer lumber (LVL), laminated strand lumber (LSL), cement board, wood, wood veneer, wood-plastic composites, plastic, plastic-cement composites, and combinations comprising any of the foregoing.

An adhesive layer 106 is disposed between the top layer 102 and an internal layer 108. The adhesive layer 106 can be disposed on an inner surface 110 of the top layer 102 or a top surface 112 of the internal layer 108. The adhesive layer is configured to adhere the top layer 102 to the internal layer 108. The adhesive layer 106 can be formed from a hot melt adhesive, a solvent based adhesive, a water based adhesive, a UV cured adhesive, or other type of adhesive, such as a UV cured polymer. Exemplary hot melt adhesives can include, without limitation, polymers such as butyl rubber, silicone rubbers, styrene-butadiene-styrene (SBS), styrene-isoprene-styrene (SIS), styrene-butadiene (SB), styrene-ethylene-butadiene-styrene (SEBS) and ethylene-vinylacetate (EVA); resins such hydrocarbon and rosin type resins, natural and petroleum waxes, oils, bitumen, combinations comprising at least one of the foregoing, and the like. Exemplary solvent-based adhesives can include the adhesives described above, dissolved or dispersed in a solvent vehicle. Exemplary water based adhesives are those based on emulsions of polymeric materials. Exemplary polymeric materials can include, without limitation, vinyl acetate and acrylic polymers and copolymers such as vinyl acetate-acrylic and EVA, as well as styrene-acrylic, vinyl chloride-acrylic, vinyl-versatate, and the like.

In one aspect, the adhesive is viscoelastic. Viscoelastic materials exhibit both viscous and elastic characteristics when undergoing deformation, including resistance to shear flow and strain linearly with time when a stress is applied (viscosity) and instantaneous strain when stretched and return to their original state once the stress is removed (elasticity). Viscoelastic adhesive layers have particular sound absorbing qualities that can further aid the soundproofing properties of the laminated structure 100. Energy in the sound waves interacting with the adhesive layer 106, when constrained by the top layer 102 and the internal layer 108, will be dissipated by the elastic nature of the adhesive, thereby reducing the energy of the sound transmitting through the laminate structure 100.

A wide variety of adhesive materials are known to have viscoelastic properties. Such adhesive materials can include, without limitation, those synthetic rubbers described above, such as SBS and SIS, other synthetic rubbers, such as butyl rubber and styrene-butadiene-rubber (SBR), polytetrafluoroethylene, fluorinated ethylene-propylene copolymers, polymethacrylates, polydimethacrylates, silicone based polymers, combinations comprising at least one of the foregoing, and the like. In addition to using thermoplastic hotmelts, impact modified thermoset systems can also be used. Multiple systems such as, but not limited to, epoxy resins, polyurethanes, polyureas, formaldehyde based resins, combinations thereof, and the like can be used to build the tie layer structure in the laminate.

In another aspect, the adhesive is a viscoelastic hot melt adhesive. Such adhesives generally contain a thermoplastic base material in combination with various additives such as a tackifier. Representative base materials include EVA copolymers, ethylene-acrylate copolymers, polyolefins such as polyethylene, polyesters, polyamides, thermoplastic polyurethanes, silicone rubbers, and styrene block copolymers such as SIS, SBR, SEBS, and styrene-ethylene/propylene (SEP). Tackifiers tend to have low molecular weight, and glass transition and softening temperature above room temperature, providing them with suitable viscoelastic properties. Representative tackiferis include rosins and their derivates, terpenes and modified terpenes, hydrogenated hydrocarbon resins, and their mixtures, terpene-phenol resins (TPR, used often with EVAs) in amounts of up to about 40 weight percent of the adhesive. A specific exemplary hot melt adhesive includes a tackifier and a styrene block copolymer, the hot melt adhesive having a viscosity at 350 degrees Fahrenheit (F) of about 22,000 to about 27,000 Centipoises (cps), and a Mettler softening point of about 269 F to about 291 F. The adhesive exhibits a peel strength of about 4.6 pounds per inch when tested in a 180 degree peel test according to ASTM D903-98. This viscoelastic hot melt adhesive is commercially available from Forbo Adhesives, LLC under the tradename Swift 81866.

The adhesive layer 106 can be spread over the inner surface 110 of the top layer 102 or the top surface 112 of the internal layer 108 in a discontinuous pattern. As such, the adhesive layer 106 will not cover the full surface of the top or internal layer. To aid in the sound proofing of the laminated structure 100, the adhesive is applied to one of the layers in a non-continuous film in order to leave parts, or spots or zones of the layer uncoated with adhesive. The adhesive layer 106 can be applied in a variety of discontinuous patterns. Exemplary patterns can include, without limitation, vertical strips, horizontal strips, dots, squares, rectangles, polygons, irregular shapes, combinations comprising at least one of the foregoing, and the like. In one aspect, the adhesive layers are applied in the laminate structure as parallel strips. In another aspect, the adhesive layers are applied in the laminate structure as parallel strips that are disposed perpendicular to the longest dimension of the structure. For example, where the laminate structure is a door to be vertically disposed in a door frame, the strips of the adhesive layer are disposed in parallel relationship to one another and in a horizontal orientation compared to the vertical orientation of the door. The spacing between the parallel strips of adhesive can be any distance effective to enhance the acoustical properties of the laminate structure. For example, a spacing of about 1 to about 4 inches, specifically about 2 inches, enhances the acoustical properties of the laminate structure. Without being bound by theory, it is believed such spacing between the parallel strips of adhesive provides fewer contact points between the layers of the structure, which further serves to insulate and decouple the laminated structure.

Regardless of the desired pattern, the adhesive layer 106 will be a discontinuous layer between the top layer 102 and the internal layer 108. In one aspect, the adhesive layer 106 is applied to cover about 5% to about 99% of the area of the top layer surface or the internal layer surface; specifically about 5% to about 75%; and more specifically about 9% to about 20%.

The adhesive layer 106 can be applied to the top and/or internal layer by any method effective in bonding the two layers together. For example, the adhesive layer 106 can be applied as beads, lines, spray, film, or a coated adhesive layer. When applied as lines or beads a bead applicator, a continuous or discontinuous slot dye or spray applicator may be used to form a discontinuous pattern. When applied as an adhesive film, a strip suitable for the desired discontinuous pattern of the adhesive layer can be cut from an adhesive tape roll, the release sheet removed (if applicable), and the strip adhered to the desired location of the top or internal layer. The adhesive may also be applied by any of the well-known processes for coating that include, without limitation, roll coating, spray coating, brushing, hand applicator, or other similar processes. The adhesive can also be applied with a putty knife, caulking gun, or other known means of applying a liquid adhesive coating. In one aspect, the adhesive layer has a thickness of about 0.001 inches to about 0.1 inch; specifically a thickness of about 0.005 inches to about 0.075 inches; and more specifically a thickness of about 0.01 inches to about 0.04 inches.

The internal layer 108 is the core of the laminated structure 100 and provides additional structural integrity thereto. While the laminated structure 100 comprises a single internal layer 108, it is to be understood that other embodiments of the laminated structure described herein could have any number of internal layers, depending upon the desired thickness, weight, strength, STC, and the like of the finished laminated structure. Likewise, additional adhesive layers would be disposed between the additional internal layers so as to ensure a secure adhered laminate structure. Exemplary materials for use as an internal layer can include, without limitation, metal, such as steel or aluminum, vinyl, cellulose, wood, gypsum, wafer board, particle board, oriented strand board (OSB), medium-density fiberboard (MDF), cement board, plastic, perforated metals, paper, metal, plastic honeycomb structures, sheet type intumescents, combinations comprising at least one of the foregoing, and the like.

As shown in FIG. 1, the internal layer 108 is disposed between the top layer 102 and the bottom layer 104. Similar to adhesive layer 106, a second adhesive layer 114 is disposed between the internal layer 108 and the bottom layer 104. The adhesive layer 114 may be applied to the inner surface 116 of the bottom layer 104 or to the bottom surface 118 of the internal layer 108. The adhesive layer 114 is configured to adhere the bottom layer 104 to the internal layer 108. The adhesive layer 114 can be formed from the same adhesive material as the adhesive layer 106 or it can be formed from a different adhesive from the above-list of adhesives. Similarly, the adhesive layer 114 will also be applied in a discontinuous pattern between the two layers. The adhesive layer 114 can have the same discontinuous pattern as that of the adhesive layer 106 or it can have a different pattern. Regardless of the pattern, the discontinuous pattern of the adhesive layer 114 will be offset from the pattern of the adhesive layer 106. In other words, the pattern of adhesive layer 114 will be misaligned with the pattern of adhesive layer 106, such that no portion of the adhesive layer 114 overlaps/aligns with a portion of the adhesive layer 106 when viewed from the top layer 102 through to the bottom layer 104, or vice versa, of the laminated structure 100. As shown in FIG. 1, the portion 120 of the adhesive layer 114 do not overlap with any portion 122 of the adhesive layer 106. Where the top surface 112 of the internal layer 108 is covered with an adhesive portion 120, the corresponding portion of the internal layer 108 on the opposite surface (i.e., the bottom surface 118) is free of any adhesive. Because no portion of one adhesive layer overlaps with portions of any of the other adhesive layers, a circuitous path is formed throughout the laminate structure. This path allows sound waves to spread through the width of the structure, which enhances the structure's ability to dissipate sound. Providing an offset pattern of adhesive layers means there is no direct line of continuous material through the cross-section of the laminated structure that would permit sound waves to pass directly therethrough. Rather, regardless of where the sound waves enter the structure, they cannot pass through the structure without traveling through at least one of the uncoated spaces in at least one of the adhesive layers.

The external layers (top and bottom) and the internal layer(s) can have any thickness. The thickness of the layers are limited only by the acoustical attenuation (i.e., STC number) desired for the resulting laminate structure and by the weight of the resulting structure, which may limit the ability to install the structure for its intended use. In one aspect, the external layers and the internal layer(s) have the same thickness. In another aspect, the external layers have a thickness different than that of the internal layer(s). In still another aspect, all the layers of the laminated structure have a different thickness.

A method of making the laminated structure includes applying a first adhesive in a first discontinuous pattern on a surface of a first external layer and/or an internal layer to adhere the first external layer to the internal layer; applying a second adhesive in a second discontinuous pattern on a surface of the internal layer opposite the first external layer and/or on a second external layer to adhere the second external layer to the internal layer, wherein the first discontinuous pattern and the second discontinuous pattern are offset such that no portion of the first adhesive layer overlaps with the second adhesive layer. Each external layer can be pressed under a predetermined pressure and temperature for a selected time to adhere the layer to the internal layer. In another embodiment, the external layers can both be added to the internal layer(s) and then all the layers placed under a predetermined pressure and temperature for a selected time to form the laminated structure.

As mentioned previously, the laminate structure can be particularly useful as a building material, such as for use in constructing, for example, walls, floors, ceilings, doors, and the like. The laminate structure described herein comprises the soundproofing qualities that are desirable for such construction applications. In one aspect, the laminate structure has a STC of about 30 to about 65; specifically about 37 to about 41. The sound transmission class numbers provided herein are numbers used in the architectural field to rate partitions, doors and windows for their effectiveness in blocking sound. The number assigned to a particular partition design as a result of STC testing represents a best fit type of approach to a set of curves that define the sound transmission class. The test is conducted in such a way to make it independent of the test environment and gives a number for the partition only. The STC measurement method is defined by the American Society for Test and Materials (ASTM) test method E90-09 for laboratory sound measurement, in one-third octave bands, of airborne sound transmission loss of building partitions and elements, by ASTM E413-04 for rating sound insulation, by ASTM E1332-90 for determination of Outdoor-Indoor Transmission class, and by ASTM E2235-04 for determination of decay rates for use in sound insulation methods. The higher the STC rating (or number), the more effective that material is at reducing sound transmission of the most common frequencies. An STC rating of 25-30 is considered "poor" and described as "normal speech is understood easily and distinctly through the material" while an STC rating of 30-35 is considered "fair" and is described as "loud speech understood fairly well through the material." For partitions, doors and the like used in current construction, it is desirable to use materials and structures having STC ratings of "good" to "very good." Such STC performance is achieved at STC ratings of 34-40 and 40-50, respectively. A "good" performance material is one through which "loud speech is heard but hardly intelligible" while a "very good" material will permit "loud speech only to be heard faintly and not understood at all."

The desire for such acoustical rated laminated structures has carried over into other building material applications, including requirements for fire-resistant applications, such as walls and doors. The desire for noise control in combination with fire protection is increasing in the design and construction of new buildings and in the renovation of existing buildings. Fire doors, as used in residential, commercial and industrial applications, are typically employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the fire wall for a limited time to permit the occupants of a building to escape and to delay the spread of the fire until fire control equipment can be brought to the scene.

In another aspect, the fire retardant properties along with the STC rating can be enhanced by using the certain adhesives, as described above, along with intumescent agents. Certain thermoset adhesives maintain laminate integrity for much longer times in a fire when compared with their thermoplastics counterparts. For example, such a thermoset adhesive can be configured to provide a viscoelastic sound damping system that has a high viscous component under normal room temperature operation, as a result of which will have excellent STC ratings. In the event of a fire, however, temperature sensitive catalysts in the adhesive system can be configured to harden and bind the laminate to ensure extended laminate integrity.

Fire door ratings are based on specific ASTM tests (e.g., method E152) where the door is expected to maintain structural integrity under fire exposure for various times. One particular mode of failure can be caused by disintegration of the adhesive layer that ties the laminate together. Therefore, it is important to design a hot-melt adhesive with the right balance between the viscoelastic properties, the pattern of application, and thermal properties critical to achieve both sound and fire performance. In one aspect, such a hot-melt adhesive would be configured to have good vibration damping (i.e., more of a viscous response) at normal operating temperatures in buildings. The adhesive would further be formulated to include temperature sensitive catalysts that trigger a crosslinking reaction at temperatures well above normal operating conditions but significantly below the disintegration temperature of the hot-melt adhesive. In the event of a fire, the hot-melt adhesive system would cure, establishing crosslinks and increasing the modulus of the adhesive, thereby providing the laminate with increased structural and adhesive integrity for a longer period of time. The temperature-dependent tunable catalytic reaction in the hot-melt adhesive system can be achieved with, for example, temperature sensitive catalysts that work as described above, and temperature sensitive inhibitors that lose functionality at higher temperature and trigger the crosslinking reaction. In another aspect, the hot-melt adhesive system can be configured such that a lack of oxygen triggers the crosslinking reaction. which is depleted by the fire. In other words, oxygen inhibits the crosslinking reaction. Upon consumption of the oxygen by the fire, the crosslinking reaction is triggered. Examples of a hot-melt adhesive system in which the absence of oxygen can trigger the crosslinking reaction can include, without limitation, acrylates and other free radical systems.

In another aspect, the hot-melt adhesive system described above can further include other optional additives configured to improve sound performance without compromising fire rating. Exemplary additives include, without limitation, intumescent agents, such as vermiculite and foaming agents. For example, the foaming agent could comprise an open or closed cell structure wherein the primary foaming gas is carbon dioxide or oxygen-depleting in nature. In this manner, the foaming agent would improve sound performance of the laminate and could also improve fire performance. Other exemplary additives include talc, gypsum, and the like. The laminate structures can further include honeycomb shaped strips in conjunction with the discontinuous hot-melt adhesive system to further improve the sound characteristics of the laminate without compromising the fire rating.

Various tests have been devised for fire doors to ensure that they meet established safety standards. One test measures the time that a given door withstands a certain temperature while maintaining its integrity. Another test measures the door's ability to withstand the forces of a high pressure water stream. Established fire door standards are incorporated into building codes and architectural specifications. For example, ASTM Method E 152, National Fire Protection Association (NFPA) Method 252 (2008), Canadian Standard Method (CAN) 104, and Underwriters Laboratories Method (UL) 10C "Positive Pressure Fire Test for Door Assemblies" requires a door to maintain its integrity for periods ranging up to 90 minutes (e.g., 20, 45, 60, and 90 min), while withstanding progressively higher temperatures and the erosive effects of a high pressure fire hose at the conclusion of the fire exposure. Similarly, British Standard 476 part 22 provides a method for determining the fire resistance for periods ranging up to 120 minutes (e.g., 90 and 120 min).

Accordingly, another aspect of the present invention includes a fire door capable of satisfying both the acoustical ratings and the fire ratings desired in current construction. In one aspect, the fire door has a 90-minute fire rating in accordance with ASTM E152, NFPA 252, CAN 104, and UL 10C and an STC rating of greater than 35 in accordance with ASTM E90-09 and ASTM E413-04. The fire door comprises two external layers comprising a gypsum fiberboard, and at least one internal layer disposed between the two external layers. The internal layer includes a gypsum panel board and two or more adhesive layers separated by the internal layer. Further, the two or more adhesive layers forms a discontinuous pattern between the internal layer and a selected one of the two external layers. Finally, the discontinuous patterns of the two or more adhesive layers are offset from one another such that no portion of one adhesive layer overlaps any portion of the other adhesive layers.

The internal door core (internal layer) and the exterior door facings (external layers) of the fire door comprise two different substrates having different densities. The internal layer comprises a gypsum panel board having a density of about 42 to 46 pounds per cubic foot (pcf). The external layers comprise a gypsum fiberboard having densities of about 60 pcf to about 80 pcf. The density and stiffness of these core layers are efficient in resisting sound vibration while the material of the layers have fire resistant properties, as will be described in greater detail below.

The internal layer of the fire door comprises a post-coated gypsum panel board comprising a set gypsum core disposed between two coated or uncoated non-woven fibrous mats. If the mats are coated, they are pre-coated prior to enmeshing or entangling with the set gypsum board core. To this end, the outer surfaces of the coated non-woven mats are pre-coated with a dried (heat cured) aqueous coating of an aqueous coating composition containing a combination (e.g., a mixture) of a mineral pigment or filler and an organic binder of a polymer latex adhesive. By "pre-coated" is meant that the non-woven fibrous mats have a dried, adherent coating of what was originally an aqueous coating composition, as hereinafter defined in more detail, applied to one of their surfaces before the non-woven mats are used to make the gypsum board for the internal layer of the fire door.

Exemplary polymer latex adhesive binders for use in formulating the mat coating include, but are not limited to, styrene-butadiene-rubber (SBR), styrene-butadiene-styrene (SBS), ethylene-vinyl chloride (EVCl), polyvinylidene-chloride (PVdCl) and poly(vinylidene) copolymers, modified poly-vinyl-chloride (PVC), poly-vinyl-alcohol (PVOH), ethylene-vinyl acetate (EVA), polyvinyl acetate (PVA) and polymers and copolymers containing units of acrylic acid, methacrylic acid, their esters and derivatives thereof (acrylic-type polymers), such as styrene-acrylate copolymers.

The composition of the set gypsum core of the gypsum board is generally similar to that used in other gypsum products, known as gypsum wallboard, dry wall, gypsum board, gypsum lath and gypsum sheathing. The set gypsum core is formed by mixing water with powdered anhydrous calcium sulfate or calcium sulfate hemi-hydrate ($CaSO_4 \cdot 1/2\ H_2O$), also known as calcined gypsum, to form an aqueous gypsum slurry, and thereafter allowing the slurry mixture to hydrate or set into calcium sulfate dihydrate ($CaSO_4 \cdot 2H_2O$), a relatively hard material.

The core of the gypsum board in the internal layer of the fire door will generally include at least about 80 wt. percent of set gypsum (fully hydrated calcium sulfate). The composition from which the set gypsum core of the board is made can also include a variety of optional additives, including, for example, those included conventionally in gypsum wallboard. Examples of such additives include set accelerators, set retarders, foaming agents, and dispersing agents.

In one aspect, in order to satisfactorily achieve the desired properties of fire resistance in the fire door, the gypsum core includes at least about 0.2 lbs of reinforcing fibers, for example chopped glass fibers, per 100 square feet of gypsum board. Usually, the gypsum core in the board will include about 0.4 to 0.6 lbs. of reinforcing fibers per 100 square feet to ensure that the board meets or exceeds the desired properties of fire resistance and acoustical rating.

Both surfaces of the set gypsum core are faced with pre-coated fibrous mats. Thus, coated mats are prepared in advance (pre-coated) and are used in making the non-woven fibrous mat faced gypsum board for the internal layer of the fire door. The coating on the mats is sufficiently porous to permit water in the aqueous gypsum slurry from which the gypsum core is made to evaporate during manufacture of the board. The gypsum board described herein is made by standard methods from an aqueous gypsum slurry well known to those of skill in the art. The non-woven fibrous mats comprise a fiber material that is capable of forming a strong bond with the set gypsum comprising the core of the gypsum board through a mechanical-like interlocking between the interstices of the fibrous mat and portions of the gypsum core filling those interstices. Examples of fiber materials useful for the non-woven mats include (1) a mineral-type material such as glass fibers, (2) synthetic resin fibers and (3) mixtures or blends thereof. In an exemplary embodiment, glass fiber mats are used for making the pre-coated mat. Nonwoven mats such as made from chopped strands and continuous strands can be used. The strands of such mats typically are bonded together to form a unitary structure by a suitable adhesive. The fiber mats can range in thickness, for example, from about 0.51 to about 0.66 millimeters (mm) (20-26 mils). The aforementioned fibrous mats are known and are commercially available.

In addition to the components mentioned above, the aqueous coating for the fibrous mats can also include water and other optional ingredients, such as colorants (e.g., dyes or pigments), thickeners or rheological control agents, defoamers, dispersants and preservatives. The amounts of such additional ingredients are proportioned to provide the desired rheological properties (e.g., viscosity) to the aqueous formulation Any suitable method for applying an aqueous coating composition to the non-woven fibrous mat substrate can be used for making the pre-coated mats, such as roller coating, curtain coating, knife coating, spray coating and the like, including combinations thereof. Following application of the aqueous coating composition to the mat, the composition is dried (cured), usually by heat, to form the pre-coated mat. Pre-coated mats made in accordance with these teachings are substantially liquid impermeable, but do allow water vapor to pass through during manufacturing of the board.

As noted above, a mineral pigment or filler comprises the major component of the coating composition. Examples of mineral pigments for use in the coated mats can include, but are not limited to, ground limestone (calcium carbonate), clay, sand, mica, talc, gypsum (calcium sulfate dihydrate), aluminum trihydrate (ATH), antimony oxide, or a combination of at least one of the foregoing.

The inorganic pigment or filler materials also may inherently contain some naturally occurring inorganic adhesive binders. Examples of such fillers, some listed with the naturally occurring binder, include (but are not limited to) the following: limestone containing quicklime (CaO), clay containing calcium silicate, sand containing calcium silicate, aluminum trihydrate containing aluminum hydroxide, cementitious fly ash and magnesium oxide containing either the sulfate or chloride of magnesium, or both. Depending on its level of hydration, gypsum can be both a mineral pigment and an inorganic adhesive binder, but it is only slightly soluble in water, and the solid form is crystalline making it brittle and weak as a binder. As a result, gypsum is not generally preferred for use.

Fillers, which inherently include an inorganic adhesive binder as a constituent and which cure by hydration, also advantageously act as flame suppressants. As examples, aluminum trihydrate (ATH), calcium sulfate (gypsum), and the oxychloride and oxysulfate of magnesium all carry molecules of water bound into their molecular structure. This water, referred to either as water of crystallization or water of hydration, is released upon sufficient heating, actually suppressing flames.

Low cost inorganic mineral pigments and fillers with the properties of those described in the preceding paragraph, thus, may provide three (3) important contributions to the coating mixture: a filler, a binder, and a fire suppressor.

The resulting gypsum panel of the internal layer comprises a set gypsum core faced with two pre-coated glass fiber mats. The surface of at least one of the mats is coated with a dried coating of an aqueous coating composition containing a combination (e.g., a mixture) of a mineral pigment; a polymer latex adhesive and optionally an inorganic adhesive binder. The core of the gypsum panel board includes at least about 0.2 lbs. of reinforcing fibers per 100 square feet of board.

The gypsum panel board of the internal layer exhibits certain fire-resistant qualities so that the fire door utilizing the board meets the fire regulations of the relevant municipal code. In particular, the gypsum panel board satisfies the 90 minute fire rating of ASTM E 152. The gypsum panel board as described above for the internal layer is commercially available from Georgia-Pacific Gypsum under the trade name Dens-Deck®, Dens-Deck Prime®, or Dens-Deck Dura-Guard®.

The external layers of the fire door comprise a gypsum fiberboard. The gypsum fiberboards used for the external layers comprise set gypsum dihydrate, a binder polymer and cellulosic fibers. The calcium sulfate dihydrate (gypsum dihydrate) of the gypsum fiberboard is derived from the hydration of any form of calcium sulfate which is in non-fibrous form and which is capable of reacting with water to form set gypsum, that is, calcium sulfate dihydrate. Thus, the calcium sulfate can be in anhydrous form or in the hemihydrate form. Of the beta forms of the hemihydrate, use of the latter is preferred. The hemihydrate can be produced from the naturally-occurring gypsum mineral by heating, or calcining, the dihydrate.

For many applications, it is not important to inquire into the crystalline form of the hemihydrate; however, with respect to the fiberboards herein, that is not the case. It is known that calcium sulfate hemihydrate can exist in two different crystalline forms, namely a non-fibrous form and a fibrous form, for example, elongated needles. In the fiberboards of the external layers, a non-fibrous form of calcium sulfate capable of reacting with water to form set gypsum is used. It should be understood, however, that a minor amount of a fibrous form of gypsum can be used as an optional constituent. A mixture of different sources of calcium sulfate can be used in the fiberboard, include waste-type materials, such as desulfurized by-product gypsum, scrap gypsum wallboard, and the like.

In the use of an aqueous dispersion to make the gypsum fiberboard for the facing of a fire door, the nonfibrous calcium sulfate generally will comprise between about 60% and about 80% by weight of the solids. The gypsum dihydrate content of the fiberboard will be about 18.5% greater than the nonfibrous calcium sulfate content of the compositions from which it is made, the difference representing the added water of hydration in the set gypsum dihydrate. That is, by weight, the set gypsum will comprise between about 75% and about 90% by weight.

The gypsum fiberboard for the external layers of the fire door may further include cellulosic fiber. Cellulosic fiber includes the fibrous component of plants, such as cotton, linen, and flax, for example. Among the various sources of cellulosic fiber, paper stock is conveniently employed. That is, the fiberboard can further include by weight about 12% to about 13%. The presence of the paper fiber makes it possible to produce a gypsum fiberboard having good physical characteristics, such as flexural strength, screw holding and surface hardness without having any separate surfacing membrane such as the paper surfacing on conventional gypsum board.

The paper fiber can be derived from virgin paper stock or previously used waste paper stock. The source of the paper can be, for example, wood, cotton or linen rags, straw, etc. The origin or history of the paper is not a critical factor. The paper may be a product of the sulfite process, the sulfate (Kraft paper) process, or other processes. Among the types of paper stock successfully employed are virgin and brown Kraft papers and, especially, newsprint. Waste newspaper provides satisfactory results, is inexpensive, and its use helps to overcome an environmental pollution problem. Moreover, the source of the paper stock can include the paper of ground paper-faced gypsum wallboard.

The gypsum fiberboard can further include one or more performance boosting additives. Exemplary additives may include, without limitation, one or more defoaming agents, dispersants, accelerators, and the like; ingredients which are well known in the art and are employed at low concentration levels, generally each at less than about 1% by weight of the solids. In the aggregate, the performance booster generally will comprise about 1.5% to about 35% by weight of the solids and will preferably be selected from inorganic fiber, clay, vermiculite, and binder polymer. Concrete (5-12% by wt.) or Sodium Silicate may be added as a wet strength binder to boost hose stream performance. The specific nature of the additive will depend to some extent on the intended utility of the fire door.

Inorganic fiber, as that term is employed herein, includes glass textile fiber and mineral wool. Briefly, the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as "siliceous fiber." As employed in the gypsum fiberboard, the glass textile fiber generally will be chopped, e.g., the fibers may be about ½ inch long.

The gypsum fiberboard for the fire door generally will include siliceous fiber. Siliceous fiber improves the fire resistance of the building material, apparently by decreasing the tendency of the gypsum construction to crack under thermal stress. The siliceous fiber may be present up to about 7% by weight and may include glass textile fiber. The gypsum fiberboard used as facing of the fire door will include, for example, about 0.8% to about 2% siliceous fiber and a combination of about 0.4% chopped glass textile fiber and about 0.5% to about 1.5% glass wool by weight.

The performance booster may also include either clay, vermiculite or both to boost the fire resistance of the fire door. Both of these materials may be present in amounts up to about 6%, specifically about 3-4% by weight of the solids. The clay to be employed will generally be kaolin clay, which is effective to control the shrinkage of the gypsum-containing construction under extreme heat. The vermiculite should be raw (i.e., unexpanded) vermiculite which swells when heated, helping to control shrinkage of the construction and possible cracking.

The gypsum fiberboard of the external layers may also include a binder polymer. The binder polymer affects the physical properties of the fiberboard, especially the flexural strength. Furthermore, the binder polymer improves the surface characteristics of the product, such as smoothing the surface and making it easier to finish.

The binder polymer, when present, may comprise up to about 15% by weight of the solids, specifically about 1% to about 3% by weight. A number of different polymeric materials may be employed as binder polymer, including homopolymers, such as poly(vinyl acetate) and polyacrylate, as well as copolymers, such as poly(ethylene)-co-(vinyl chloride), poly(styrene)-co-(butadiene), and poly(vinyl acetate)-co-(methyl acrylate). Among the various binder polymer possibilities, esters of poly(vinyl alcohol) are effective, specifically poly(vinyl acetate) homopolymers. The binder polymer can be introduced as an aqueous emulsion, many of which are commercially available.

The gypsum fiberboard composition will also include water in an amount in vast excess of that required to react with and hydrate the calcined nonfibrous gypsum. That is, specifically at least about a 25-fold excess amount of water should be present. Contrary to the conventional wisdom, the excess water provides processing advantages and leads to products which possess superior properties.

As mentioned, the gypsum fiberboard of the external layers exhibit certain fire-resistant qualities so that the fire door utilizing the board meets the fire regulations of the relevant municipal code. In particular, the gypsum fiberboard satisfies the 90 minute fire rating of ASTM E 152. The gypsum fiberboard as described above for the external layers is commercially available from Georgia-Pacific Gypsum under the trade name FIRESTOP.

The gypsum fiberboard of the external layers and the gypsum panel board of the internal layer described herein can be held together to form the fire door with adhesive layers disposed therebetween. As described above, the adhesive layers join the substrate layers of the fire door, but also create an air gap between the individual layers by their discontinuous application patterns. The gaps between the internal and external layer created by the discontinuous pattern of the adhesives are effective in absorbing and/or spreading the sound waves passing through the fire door. The gypsum compositions for both the external and internal layers provide fire resistant qualities to the fire door. Moreover, the density of the gypsum-based substrates aids in resisting sound vibration. Combined with the staggered/misaligned patterns of the two adhesive layers, the fire door is effective in increasing transmission loss and STC ratings. When compared to traditional mineral core fire doors and heavier mass doors, the fire door described herein has improved soundproofing qualities. See Table 2.

The present disclosure is further illustrated by the following non-limiting examples:

EXAMPLES

The laminated structures described above were used in the construction of doors that were then tested for soundproof quality. Five different door samples were tested in the fixed and operable conditions at an accredited laboratory according to the procedures listed in ASTM E90-04 and E 413-04 for nonoperable and operable STC ratings. Sound transmission loss tests were initially performed on the filler wall that was designed to test 40 inch by 86 inch and 80 inch by 86 inch test specimens. The filler wall achieved an STC rating of 67. The 40 inch by 86 inch plug was removed from the filler wall assembly. The door system was placed on a foam isolation pad in the test opening. For nonoperable (fixed) testing the test specimen was sealed on the periphery edges with a dense mastic. For operable testing, the doors were mounted on hinges with door hardware, vision panels, and perimeter seals and the door panel was opened and closed 5 times prior to testing.

The sound transmission loss test consisted of the following measurements: one background noise sound pressure level and five sound absorption measurements were conducted at each of the five microphone positions. Two sound pressure level measurements were made simultaneously in both rooms, at each of the five microphone positions. The air temperature and relative humidity conditions were monitored and recorded during the background, absorption, source, and receiving room measurements.

The STC rating was calculated in accordance with ASTM E413. Table 1 provides a description of the door samples tested.

TABLE 1

| Sample No. | Identifier | Description |
|---|---|---|
| 1 | Gypsum Core | Standard mineral gypsum door core |
| 2 | LDF Core | Low-density (50 pcf minimum) Georgia-Pacific FIRESTOP door core |
| 3 | HDF Core | High-density (70 pcf minimum) Georgia-Pacific FIRESTOP door core |
| 4 | Low-density Laminated Door | A Dens-Deck ® internal layer sandwiched by external layers of the LDF core of sample 2 with discontinuous offset 3/16-inch lines spaced 2-inches apart of Swift 81866 adhesive commercially available from Forbo Adhesives between the layers. |
| 5 | High-density Laminated Door | A Dens-Deck ® internal layer sandwiched by external layers of the HDF core of sample 3 with discontinuous offset 3/16-inch lines spaced 2-inches apart of Swift 81866 adhesive between the layers |

Sample No. 1 was a Firedefender® brand mineral core commercially available from Georgia-Pacific LLC. It had a density of about 30-32 pcf, and is composed of a blend of gypsum, expanded perlite, and inert binders.

Table 2 shows the results of both the fixed and operable testing for the five door samples.

TABLE 2

| Sample No. | Weight per door (lbs) | Fixed STC Testing | Operable STC Testing |
|---|---|---|---|
| 1 | 120 | 34 | n/a |
| 2 | 183 | 38 | n/a |
| 3 | 260 | 41 | 37-39 |
| 4 | 170 | 39 | 37-39 |
| 5 | 205 | 40 | 38-40 |

Looking at the fixed STC testing, both the high-density and low-density laminated doors outperformed the standard mineral gypsum door core. The standard gypsum core door had an STC rating of 34, while the high-density laminated door had a rating of 40. With regard to the STC performance classes described above, this shifts the door performance from a "good" rating to a "very good" rating. In operable STC testing, the HD and LD laminated doors also outperformed the respective door cores made up of just the FIRESTOP® although all the samples fall in the "good" classification. The HD and LD laminated doors, however, were substantially lighter than the HD and LD door cores alone. This represents reduced material cost as well as increased ease in installation.

Ranges disclosed herein are inclusive and combinable (e.g., ranges of "up to about 25 wt %, or more specifically, about 5 wt % to about 20 wt %" is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term. In addition, it is to be understood that the described elements may be combined in any suitable manner in the various aspects.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims.

What is claimed is:

1. A laminated structure, comprising:
   a first external layer and a second external layer;
   at least one internal layer disposed between the first external layer and the second external layer;
   a first adhesive layer disposed between the first external layer and the internal layer, wherein the first adhesive layer is patterned to cover only a first portion of the internal layer; and
   a second adhesive layer disposed between the second external layer and the internal layer, wherein the second adhesive layer is patterned to cover only a second portion of the internal layer on a side opposite the first adhesive layer, and wherein all of the first adhesive layer is misaligned with all of the second adhesive layer such that no portion of the second adhesive layer is between the misaligned portion of the first adhesive layer and the second external layer with respect to an axis perpendicular to the internal layer.

2. The laminated structure of claim 1, wherein the structure has a sound transmission class rating of about 30 to about 65 when tested in accordance with ASTM E90-04 and E413-04.

3. The laminated structure of claim 1, wherein the structure has a sound transmission class rating of about 37 to about 41 when tested in accordance with ASTM E90-04 and E413-04.

4. The laminated structure of claim 1, wherein at least one of the first adhesive layer and the second adhesive layer comprises a hot melt adhesive, a solvent based adhesive, a water based adhesive, a UV cured adhesive, or a combination comprising at least one of the foregoing.

5. The laminated structure of claim 1, wherein the first adhesive layer and the second adhesive layer comprise a viscoelastic hot melt adhesive.

6. The laminated structure of claim 5, wherein the viscoelastic hot melt adhesive comprises a temperature sensitive catalyst configured to trigger a crosslinking reaction at a temperature greater than a normal operating temperature but below a disintegration temperature of the hot-melt adhesive.

7. The laminated structure of claim 5, wherein the viscoelastic hot melt adhesive comprises a temperature sensitive catalyst configured to cure the viscoelastic hot melt adhesive in the event of a fire.

8. The laminated structure of claim 5, wherein the viscoelastic hot melt adhesive comprises a temperature sensitive inhibitor, wherein the temperature sensitive inhibitor is configured to trigger a crosslinking reaction in the adhesive when exposed to heat from a fire.

9. The laminated structure of claim 5, wherein the viscoelastic hot melt adhesive comprises an intumescent agent, and wherein the intumescent agent comprises an oxygen-depleting foaming gas.

10. The laminated structure of claim 1, wherein the first adhesive layer and the second adhesive layer comprise a discontinuous pattern of adhesive, wherein the pattern comprises vertical strips of adhesive, horizontal strips, dots, squares, rectangles, polygons, irregular shapes, or combinations comprising at least one of the foregoing patterns.

11. The laminated structure of claim 10, wherein the first adhesive layer and the second adhesive layer comprise a discontinuous pattern of parallel strips of adhesive disposed perpendicular to a longest dimension of the laminated structure.

12. The laminated structure of claim 11, wherein the parallel strips are spaced about 1 to about 4 inches apart.

13. The laminated structure of claim 12, wherein the parallel strips are spaced about 2 inches apart.

14. A laminated structure, comprising:
   an internal layer disposed between a first external layer and a second external layer;
   a first adhesive layer disposed between the first external layer and a first side of the internal layer, wherein the first adhesive layer is patterned to provide a covered portion of the first side and an uncovered portion of the first side; and
   a second adhesive layer disposed between the second external layer and a second side of the internal layer, wherein the second adhesive layer is patterned to provide a covered portion of the second side and an uncovered portion of the second side,
   wherein the first adhesive layer and the second adhesive layer each comprise a viscoelastic hot melt adhesive, and
   wherein the covered portion of the first side is misaligned with the covered portion of the second side such that none of the covered portion of the second side is between the covered portion of the first side and the second external layer with respect to an axis perpendicular to the internal layer.

15. The structure of claim 14, wherein each of the first external layer and the second external layer comprise a gypsum fiberboard, and wherein the internal layer comprises a gypsum panel board.

* * * * *